United States Patent
Sivavec

(10) Patent No.: US 6,464,864 B2
(45) Date of Patent: Oct. 15, 2002

(54) COMPOSITION FOR TREATING AQUEOUS COMPOSITION CONTAMINANTS

(75) Inventor: Timothy Mark Sivavec, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/805,688

(22) Filed: Mar. 13, 2001

(65) Prior Publication Data

US 2001/0042723 A1 Nov. 22, 2001

Related U.S. Application Data

(62) Division of application No. 09/257,405, filed on Feb. 25, 1999, now Pat. No. 6,238,570.

(51) Int. Cl.⁷ .................................................. C02F 1/70
(52) U.S. Cl. ..................................... 210/170; 423/561.1
(58) Field of Search ................................ 210/717, 719, 210/720, 724, 747, 749, 757, 170, 901, 908, 912, 913, 919; 588/206; 405/128; 423/560, 563, 561.1, 566.2, 566.3

(56) References Cited

U.S. PATENT DOCUMENTS

| | | | |
|---|---|---|---|
| 3,294,680 A | * 12/1966 | Lancy | |
| 4,026,797 A | * 5/1977 | Nikolic et al. | |
| 4,599,177 A | * 7/1986 | Hayashi et al. | 210/718 |
| 4,705,639 A | * 11/1987 | Aldrich | 210/720 |
| 5,340,376 A | * 8/1994 | Cunningham | 210/610 |
| 5,362,394 A | * 11/1994 | Blowes et al. | 210/617 |
| 5,391,305 A | * 2/1995 | Haitko | 210/757 |
| 5,447,639 A | * 9/1995 | Sivavec | 210/747 |
| 5,514,279 A | * 5/1996 | Blowes et al. | 210/747 |
| 5,575,927 A | * 11/1996 | Sivavec et al. | 210/747 |
| 5,750,036 A | 5/1998 | Sivavec | 210/747 |
| 5,833,855 A | * 11/1998 | Saunders | 210/747 |
| 6,039,882 A | * 3/2000 | Wolfe et al. | 210/747 |
| 6,068,777 A | * 5/2000 | Kimura et al. | 210/747 |
| 6,207,114 B1 | * 3/2001 | Quinn et al. | 210/747 |
| 6,342,162 B1 | * 1/2002 | Heidenreich | 210/719 |

* cited by examiner

Primary Examiner—David A. Simmons
Assistant Examiner—Frank M. Lawrence
(74) Attorney, Agent, or Firm—Toan P. Vo; Noreen C. Johnson

(57) ABSTRACT

A non-iron sulfide is introduced into an iron-containing zone to form ferrous sulfide. A contaminated aqueous composition is then contacted with the ferrous sulfide to react with said contaminants.

26 Claims, No Drawings

COMPOSITION FOR TREATING AQUEOUS COMPOSITION CONTAMINANTS

This application is a division of U.S. patent application Ser. No. 09/257,405, filed Feb. 25, 1999, and now U.S. Pat. No. 6,238,570.

BACKGROUND OF THE INVENTION

The present invention relates to a method for treating aqueous composition contaminants. In particular, the invention relates the treatment of aqueous compositions containing contaminating halogenated hydrocarbons, oxidized metal species, radionuclides, or mixtures thereof.

Halogenated hydrocarbons, particularly chlorinated hydrocarbons, are excellent solvents for many applications. They have low flammability and are fairly stable, both chemically and biologically. They are commonly used in industry as chemical carriers and solvents, paint removers and cleaners. The cleaning applications include metal degreasing, circuit board cleaning, metal parts cleaning and dry cleaning. Chlorinated solvents are also used as intermediates in chemical manufacturing and as carrier solvents for pesticides and herbicides.

Chlorinated hydrocarbons are very stable compounds and are relatively toxic at low levels. Groundwaters have become contaminated by chlorinated hydrocarbons from sources, such as disposal facilities, chemical spills and leaking underground storage tanks. Chlorinated solvents also may be released to the environment through the use, loss, or disposal of a neat liquid, or through the use or disposal of wash and rinse waters containing residual solvents. Chlorinated solvents are among the most common ground water contaminants because of their widespread use and stability.

Subsurface movement and dispersion of chlorinated solvents vary depending on whether the solvents are released as neat liquid or in dissolved form. If released in dissolved form, chlorinated solvent migration is governed largely by hydrogeological processes. The presence of solubilizing agents, such as soaps (from wash waters), counteracts natural soil sorption-retardation mechanisms and facilitates the migration of the dissolved solvents. If the chlorinated solvent is released as a neat liquid, the liquid solvent migrates downwardly through a soil column under the force of gravity. A portion of the solvent is retained in the soil pores. If sufficient solvent is present, however, the soil pores become saturated. Further, solvent then continues to move downwardly until it encounters a physical barrier or the water table. If the solvent encounters the water table, it spreads out until enough mass accumulates to overcome capillary forces. At this point, the greater density of the chlorinated solvent causes it to penetrate the surface of the water table and to travel downwardly by gravity until the mass of moving liquid is diminished by sorption or until it encounters an aquitard.

In recent years, groundwater contamination by chlorinated hydrocarbons from sources, such as disposal facilities, chemical spills and leaking underground storage tanks, has become a significant environmental problem. Many of these chlorinated hydrocarbons are highly toxic and classified as carcinogens or suspect carcinogens. Of particular concern are the chlorinated ethylenes, such as trichloroethylene (TCE), tetrachloroethylene, commonly known as perchloroethylene (PCE) and chlorinated ethanes, such as 1,1,1-trichloroethane (TCA), which have been used as degreasing agents in a variety of industrial applications. Although the use of chlorinated degreasing agents was severely curtailed in 1976, improper storage and uncontrolled disposal practices resulted in significant contamination to groundwater aquifers. Chlorinated solvents are highly mobile in soils and aquifers, due to their high water solubility (e.g., 1100 mg/L TCE at 25° C.), and a need exists for removal treatments them from groundwater.

Pump-and-treat is a commonly applied treatment scheme for contaminated groundwater. The treatment usually involves withdrawing contaminated water from a well, volatilizing the contaminants in an air stripping tower, and adsorbing the vapor phase contaminants onto granular activated carbon (GAC). There are substantial limitations to pump-and-treat technology. The process is inefficient and some sites can require treatment for many decades.

It is known that chlorinated compounds can be degraded by reductive dechlorination, that is, replacement of chlorine substituents by hydrogen. Metallic elements, such as iron and zinc, have been used to degrade chlorinated organic compounds. Several systems have used iron metal to conduct reductive dechlorination of hydrocarbons in aqueous compositions. Gillham, in U.S. Pat. No. 5,266,213, discloses feeding contaminated groundwater through a trench containing an iron species. The process is conducted under strict exclusion of oxygen over a lengthy period of time. Large amounts of iron are needed for completion of the reactions. Additionally, it is difficult to introduce large volumes of solid reaction material, such as iron filings, into effective depths for in situ remediation.

Sivavec, in U.S. Pat. No. 5,447,639, teaches a method for enhanced remediation of aqueous solutions contaminated with chlorinated aliphatic hydrocarbons. The method comprises reacting reductively the chlorinated hydrocarbons with ferrous sulfide to generate innocuous byproducts, such as ethane, ethene, and chloride ion from chlorinated ethenes. Chlorinated aliphatic hydrocarbons, including trichloroethylene (TCE), tetrachloroethylene, and chlorinated ethanes such as 1,1,1-trichloroethane, are reduced to ethene, ethane, and chloride ion ($Cl^{-1}$) when contacted with iron (II) sulfide under aerobic or anaerobic conditions. The reaction may proceed, in situ or ex situ, by an electron transfer mechanism at the mineral-water interface wherein ferrous ion ($Fe^{+2}$) and/or sulfide in ferrous sulfide function as reducing agents and are oxidized to ferric ion ($Fe^{+3}$) and sulfate ($SO_4^{-2}$), respectively.

According to U.S. Pat. No. 5,447,639, an effective amount of ferrous sulfide is admixed with a contaminated aqueous composition to generate ethane, ethene, and chloride ion. Granular ferrous sulfide may be filled into a pit, ditch, screened well or trench, and used to react with and degrade chlorinated aliphatic compounds in a migrating plume, such as groundwater aquifer and drainage runoff. In another aspect, a tower column is packed with ferrous sulfide. Industrial wastewater or pumped groundwater is then treated in the tower. Additionally, an inert filler, such as sand, gravel, pebbles, and the like, can be added to the ferrous sulfide to increase its hydraulic conductivity. Polymeric adsorbents, such as polyethylene, polypropylene, thermoplastic elastomers, and carbon-filled rubbers, can also be admixed with the granular ferrous sulfide.

Sivavec in U.S. Pat. No. 5,750,036 teaches a process for the reductive dehalogenation of halogenated solvents by contact with ferrous ion-modified clay minerals and iron (III)-containing soils, sediments or aquifer materials. Examples of ferrous ion sources include iron(II) sulfate heptahydrate, and the reductive dissociation product of magnetite ($Fe_3O_4$) and oxalic acid.

According to U.S. Pat. No. 5,750,036, ferrous ion is introduced into clay minerals, clay bearing soils or sediments, iron(III) minerals and iron(III)-bearing soils, or sediments by a variety of methods. Examples of the methods include: (1) direct treatment of contaminated material with ferrous ion in aqueous solution; (2) dissolution of ferrous ion provided by the interaction of iron-bearing minerals with organic and inorganic reducing agents; (3) dissolution of ferrous ion resulting from iron metal corrosion; (4) dissolution of ferrous ion formed by electrolytic processes at iron electrodes; and (5) dissolution of ferrous ion produced by stimulation and growth of iron-reducing bacteria in iron-containing substrates such as soil sediment.

Lancy, in U.S. Pat. No. 3,294,680, discloses conditioning spent cooling water that has a toxic hexavalent chromium solution content. According to the method, a mass of hard metal sulfide granules is provided and cooling water is moved through the mass in contact with surface-reacting granules. The hexavalent chromium solution content is converted to trivalent chromium.

There remains a need to effectively treat aqueous compositions, particularly groundwater, that is contaminated with chlorinated hydrocarbons, oxidized metal species, radionuclides, or mixtures thereof.

SUMMARY OF THE INVENTION

The invention is a method for treating a contaminated aqueous composition, such as groundwater. A non-iron sulfide is introduced into an iron-containing zone to form ferrous sulfide. A contaminated aqueous composition then contacts with the ferrous sulfide. The aqueous composition may be contaminated with halogenated hydrocarbon, oxidized metal species, radionuclides, or mixtures thereof. The sulfide is mineralized to ferrous sulfide to react with and dehalogenate halogenated hydrocarbon, and thus reduces oxidized metal species and radionuclides.

In another aspect, the invention includes a composition of matter that comprises a non-iron sulfide emplaced with an iron- containing material in a reaction zone for contact with a contaminated aqueous composition.

DETAILED DESCRIPTION OF THE INVENTION

The present invention relates to a method for treating aqueous compositions to remove and destroy contaminants. Herein, the term "aqueous composition" includes water environments, particularly natural water environments, such as, but not limited to, aquifers, particularly groundwater, and other subsurface environments generally, and pond and stream sediments and dampened soil. The invention also relates to the destruction of contaminants from process or waste waters, particularly industrial waste waters, as the waters are passed through columns or canisters packed with reactive materials. Contaminants include, but are not limited to, halogenated hydrocarbons, oxidized metals, and radionuclides.

One embodiment the present invention comprises a method for the reductive dehalogenation of halogenated solvents by contact with iron-bearing aquifer materials, soils, sediments, or clay minerals modified by treatment with a sulfide species, other than iron sulfide. Alternatively, reductive dehalogenation occurs through contact with at least one iron (III)-containing mineral modified by treatment with a sulfide species, other than iron sulfide. Illustrative iron (III)-containing minerals include, but are not limited to, magnetite, goethite, hematite, maghemite, ferrihydrite, and lepidocrocite.

Sulfide alone is unreactive with halogenated hydrocarbons. Sulfide reductive dehalogenation of halogenated hydrocarbons in the presence of iron appears to proceed according to two mechanisms: (1) the sulfide acts as a reductant to reduce iron(III)-containing minerals, such as, but not limited to, magnetite, goethite and lepidocrocite to iron(II); and (2) the sulfide mineralizes with iron(II) to generate ferrous sulfide. The chlorinated solvents degradation may occur by a reductive dechlorination mechanism in which carbon-chlorine bond reduction is coupled to the oxidation of Fe(II) to Fe(III) at, for example, a clay-bound, ferrous-water interface. For example, trichloroethylene (TCE), dichloroethylene (DCE), and vinyl chloride (VC) are reduced to ethene, ethane, ethyne, and chloride. DCE and VC are intermediate products of TCE, but are subsequently reduced to ethene, ethane, ethyne, and chloride.

The treatment method can be applied to treatment of water contaminated with water-miscible or soluble-halogenated, organic compounds. Chlorinated solvent is a common contaminant in aquifers and subsurface water-containing environments. TCE, DCE, VC, tetrachloroethylene, dichloroethane,. trichloroethane, carbon tetrachloride, chloroform, dichloromethane, and chloromethane are illustrative examples of contaminants. Other halogenated hydrocarbon compounds that may be treated include chloroethane, methyl chloride, brominated methanes, brominated ethanes, brominated ethenes, fluorinated methanes, fluorinated ethanes, fluorinated ethenes, fluorochloromethanes, fluorochloroethanes, fluorochloroethenes, hydrofluorochlorocarbons, and hydrofluorocarbons. The reduction process of the invention reduces TCE, DCE, and VC to ethene, ethane, ethyne, and chloride. Lower concentrations of C3, C4, C5, and C6 hydrocarbons are also generated.

The invention has application for in-situ treatment of groundwater contaminated with halogenated, particularly chlorinated, solvents. Natural hydraulic gradients transport contaminants to sulfide-treated mineralized zones, where degradation of the contaminants occurs to remove them from the flowing water. If the concentration of contaminants, groundwater velocity, and rate of degradation are known or can be predicted, injection of sulfide into an environment along with, or in the presence of Fe(III), can mineralize a sufficient quantity of ferrous sulfide that can completely degrade migrating contaminants. The treatment of an aqueous environment contaminated with halogenated, particularly chlorinated, hydrocarbon compounds, comprises emplacing a non-iron sulfide with an iron-bearing mineral, soil, or aquifer material to mineralize an effective amount of ferrous sulfide within the environment to provide reactive sites. The halogenated hydrocarbon compounds are dehalogenated at the reactive sites to reduce hydrocarbons and halide ions. An "effective amount" of ferrous sulfide means an amount to reduce at least some halogenated aliphatic hydrocarbons to ethane, ethene, and halide ions.

An iron-bearing mineral or soil can be emplaced along with the non-iron sulfide. Further, in situ iron-bearing clays, soil, or aquifer material can be modified by injected non-iron sulfide in solution. Exemplary iron(III)-containing minerals include, but are not limited to, magnetite, goethite, hematite, maghemite, ferrihydrite, and lepidocricite. Natural hydraulic gradients then transport the organic contaminants to the modified clay zones, where degradation of the contaminants occurs. The non-iron sulfide can be introduced from an appropriate location, for example, from an excavated trench. Injection wells may be used to pump aqueous sulfide ion-containing compositions to great depths. The pumping generates at at least one of strategically placed reactive zones, permeable treatment for perimeter control of a contaminated site. Migrating plumes of ground water contaminated with halogenated hydrocarbons are intercepted by the implanted or created reactive zones thereby stopping the flow of contaminants. Also, the non-iron sulfide can be introduced into a substrate from a screened well, such as a well that contains a sulfide salt as a solid reagent. The migrating groundwater dissolves the sulfide salt through the screened well and distributes it to clay-containing areas to mineralize as ferrous sulfide. The non-iron sulfide salt may also be polymer-coated, so as to provide a controlled slow release of sulfide into the groundwater.

The process may be performed in an ex-situ column or canister containing iron-bearing minerals, soils, or clays that have been treated with non-iron sulfide, where applicable. In an ex situ application, a column can be packed with the iron(III)-containing species, such as, but not limited to, an iron (III)-containing mineral including magnetite, goethite, hematite, maghemite, ferihydrite, lepidocricite, or mixtures thereof. Aqueous sulfide is then introduced into the column to generate ferrous sulfide. Groundwater can then be passed through the column. Alternatively, industrial wastewater can be directly passed through the column for remediation. Column dimensions and water input flow are selected to provide an adequate and optimal residence time to degrade contaminants.

Alternatively, sulfide-modified clays can be prepared ex situ by contacting excavated iron-bearing clays with non-iron sulfide in aqueous solution. The modified clays may be covered in geotextile fabric to facilitate handling and placement. Covered or emplaced clays can then be used as landfill liners, soil covers, or as-treatment zones in remediation processes, including, but not limited to, electroosmotic processes. The non-iron sulfide can be added in any convenient form, such as sodium sulfide. For example, sodium sulfide comprises at least one of sodium sulfide nonahydrate ($Na_2S \cdot 9H_2O$), anhydrous sodium sulfide ($Na_2S$), sodium hydrogen sulfide, and hydrogen sulfide.

An inert filler including, but not limited to, pebbles, pea gravel, or coarse sand, can be admixed with iron-bearing mineral in either an in situ or ex situ treatment to assure that groundwater flow is not impeded when fines of ferrous sulfide are deposited. The filler also serves to decrease the resistance of a closely packed soil or aquifer material to groundwater flow.

The reaction of the invention can be buffered or unbuffered. The pH range is in a range between about 3 and about 11 (inclusive) for unbuffered reactions. The pH range is in a range between about 5 and about 9 (inclusive) for buffered reactions Organic and inorganic reductants can be used to help solubilize ferrous ion from iron-bearing soils, sediments, and aquifer materials. Examples of organic reductants include, but are not limited to, organic acids, such as formic acid, acetic acid, propionic acid, malonic acid, oxalic acid, malic acid, ascorbic acid, succinic acid, citric acid, lactic acid, and EDTA. Salts of organic acids may also be used as organic reductants. Illustrative examples of organic salts include, but are not limited to, sodium formate, sodium acetate, sodium malonate, sodium oxalate, sodium ascorbate, sodium lactate, sodium citrate and sodium ethylenediaminetetraacetic acid.

In another embodiment of the invention, a treatment of aqueous compositions contaminated with oxidized metal, radionuclide, or mixtures of oxidized metal and radionuclide. The aqueous compositions can be produced by the migration of groundwater through exposed mine tailings. An effective amount of non-iron sulfide is injected into an iron-bearing mineral, soil, or clay to mineralize ferrous sulfide within the iron-containing environment to provide reactive sites at which the oxidized metal or radionuclide can be reduced to a lower oxidation state, for example, a precipitated oxidation state. Examples of oxidized metal or radionuclide include, but are not limited to, hexavalent chromium and hexavalent uranium. The oxidized metal can be chromate or other oxidized chromium-containing species. The radionuclide comprise uranyl ($UO_2^{+2}$) and other oxidized uranium-containing species.

The method may also be used to treat aqueous compositions that are contaminated with a mixture comprising halogenated hydrocarbons, and oxidized metal species, halogenated hydrocarbons and radionuclides, or halogenated hydrocarbons oxidized metal species, and radionuclides. An illustrative mixture contains a halogenated hydrocarbon, an oxidized chromium species, and a radionuclide, such as uranyl.

The invention is further illustrated by the following examples. These examples are not meant to limit the invention in any way. The measurements and values set forth below are approximate.

EXAMPLE 1

Site soil (50.0 grams (g)) was added to each of eight 120 milliliter (mL) borosilicate glass vials. The soil comprised about 5.7% silt and clay, 18.4% fine to medium sand, 52.8% medium to coarse sand, 20.6% coarse sand to gravel, and 2.4% >¼ inch gravel. Total iron content of the soil measured 0.21%. Milli-Q®-filtered (filtration system by Millipore Corporation, Bedford, Mass.) deionized water was filter-sterilized (0.2 μm) and sodium sulfide nonahydrate was added to provide a 50 millmole (mM) solution. The pH of the solution measured 12.0. Measurement of pH was conducted using a Ross Sure-Flow pH combination electrode, standardized with pH 7 and 10 buffers. TCE was added to provide a solution that analyzed as having about .0.885 milligrams per liter (mg/L) TCE.

Three vials were filled to capacity with the soil and sodium sulfide/TCE solution. Three control vials, which contained no soil, were also filled to capacity with the same sodium sulfide/TCE solution. Further, three vials were also filled to capacity with the soil and sodium sulfide/TCE solution, after the pH of the solution had been adjusted to pH 7 by the addition of 50% HCl. Three control vials that contained no soil were also filled to capacity with the same sodium sulfide/TCE solution at pH 7. Two additional control vials were prepared, each containing 50.0 g soil and 0.885 mg/L aqueous TCE and no sulfide amendment.

The fourteen vials were capped with Teflon-lined septa and sealed with an aluminum crimp cap. The contents were mixed by rotation on a jar mill set at 35 rpm. All experiments were conducted at ambient temperature (approx. 25° C.).

After 16 hour (h), 24 h and 48 h sample times, the vials in each series were removed from the jar mill and the jar contents were allowed to settle. Aqueous solution aliquots (5.0 mL) of the were removed from vials at each sample time using a 10 mL gas-tight syringe and positive nitrogen pressure using an 18 gauge, 1.5 in. bevel-tipped needle. The water samples (each 5.0 mL) were sampled on a Tekmar purge-and-trap concentrator (with autosampler) interfaced with a gas chromatograph equipped with a flame ionization detector (Tekmar ALS 2016 autosampler (method 8: US EPA 601/624); Tekmar 3000 purge-and-trap concentrator and Hewlett Packard 5890 series 11 gas chromatograph). A Hewlett Packard HP-624 capillary column (30 meter (m) length, 0.53 millimeter (mm) inside diameter (i.d.), 3 micrometer ($\mu$m) film thickness) was used. The following GC temperature program was used: 40° C. for 5 minutes (min), 10° C./min to 180° C., 180° C. for 10 min. TCE, cis-DCE, 1,1-DCE and VC standards ranging from 1 microgram per liter ($\mu$g/L) to 25,000 $\mu$g/L were used to calibrate the gas chromatograph-flame ionization detector (GC-FID) response.

The aqueous phase was also analyzed for hydrocarbon gaseous products by purge-and-trap GC-FID, using a second Tekmar purge-and-trap concentrator interfaced with a gas chromatograph equipped with a flame ionization detector (Tekmar ALS 2016 autosampler (method 8: US EPA 601/624); Tekmar 3000 purge-and-trap concentrator and Hewlett Packard 5890 series 11 gas chromatograph). A PLOT fused silica $Al_2O_3/Na_2SO_4$ analytical column supplied by Chrompack, Inc. (50 m, 0.32 mm i.d., 0.45 mm outside diameter (o.d.), 5 $\mu$m film thickness) was used to achieve separation of C1–C6 hydrocarbon gases. The following GC temperature program was used: 75° C. for 5 min, 20° C./min to 120° C., 120° C. for 30 min.

Samples of settled aqueous phase (5.0 mL) were withdrawn by gas-tight syringe and loaded directly onto the Tekmar 2016 autosampler. Ethane, ethene, ethyne, propane, propane, and seven C4 hydrocarbons (isobutane, n-butane, trans-2-butene, 1butene, isobutene, cis-2-butene and 1,3-butadiene) were calibrated from 1% mixtures in nitrogen (Scott Specialty Gases) using a direct injection method. Ten volumes of the 1% gas mixtures (5 microliters ($\mu$L) to 500 $\mu$L) were used to generate the twelve calibration curves.

The results of the batch experiments are summarized below in Tables 1 and 2. Table 1 provides the results of reductive dechlorination of TCE with soil amended with sulfide at pH 12 (50.0 g soil, 50 mM sodium sulfide and 0.885 mg/L aqueous TCE). Table 2 provides the results of reductive dechlorination of TCE with soil amended with sulfide at pH 7 (50.0 g soil, 50 mM sodium sulfide and 0.885 mg/L aqueous TCE). C/Co represents the ratio of measured concentration to initial concentration.

TABLE 1

| Time h | [TCE] mg/L | C/Co | Ethane, ethene and ethyne as equiv. TCE | pH |
|---|---|---|---|---|
| 0 (TCE/soil/ sulfide | 0.885 | 1.000 | — | 12.0 |
| 16 | 0.110 | 0.124 | 0.84 | 11.7 |
| 24 | 0.013 | 0.015 | 0.82 | 11.7 |
| 48 | .001 | .001 | 0.77 | 10.9 |
| 0 (TCE/sulfide control) | 0.885 | 1.000 | — | |
| 16 control | 0.880 | 0.994 | n.d. | |
| 24 control | 0.869 | 0.982 | n.d. | |
| 48 control | 0.851 | 0.961 | n.d. | |
| 48 (soil/TCE control | 0.855 | 0.966 | n.d. | |

In the Tables, "n.d." means non-detected by purge-and-trap GC-FID. Black precipitate, which was formed as a result of the sulfide amendment of the soil, was analyzed by X-ray diffraction (XRD) and its diffraction pattern matched that of ferrous sulfide.

TABLE 2

| Time h | [TCE] mg/L | C/Co | Ethane, ethene and ethyne as equiv. TCE | pH |
|---|---|---|---|---|
| 0 (TCE/soil/ sulfide | 0.885 | 1.000 | — | 7.2 |
| 16 | 0.080 | 0.090 | 0.93 | 7.4 |
| 24 | 0.009 | 0.010 | 0.85 | 7.4 |
| 48 | <0.001 | <0.001 | 0.88 | 7.5 |
| 0 (TCE/sulfide control) | 0.885 | 1.000 | — | |
| 16 control | 0.876 | 0.950 | n.d. | |
| 24 control | 0.841 | 0.982 | n.d. | |
| 48 control | 0.803 | 0.907 | n.d. | |
| 48 (soil/TCE control) | 0.764 | 0.863 | n.d. | |

EXAMPLE 2

The following illustrates the method by which an iron-bearing soil have sulfide added thereto in a soil-packed column, thus providing a reactive media that reductively dechlorinates chlorniated solvents.

A 2×24 in. column containing 11 glass sampling ports spaced at 2 in. intervals along the length of the column was packed with the following materials (in order from bottom to top); 1.5 in. glass beads (3 mm diameter), 6 in. sand, 12.5 in. soil and 4 in. sand. The soil used was identical to that of Example 1, except that it was autoclaved three times at 120° C. and 15 lb pressure for 3 h with a rest period of 24 h between each autoclaving. Approximately 1000 cc of soil were packed into the column. The column was capped with Teflon end caps connected to ⅛ inch Teflon tubing. The water flow direction was from column bottom to column top. A Teflon piston pump (Fluid Metering, Inc.; ceramic liner and piston) was used to pump water into the column at a set input flow rate.

Sampling of the column was performed at the sample ports fitted with Teflon septa and aluminum crimp caps into which 2 in. sample needles with luer-lock connectors were placed. Each needle tip at each sample port was permanently positioned into the center of the column. Two-way luer-lock connectors were attached to each needle. Sampling of the column was performed using gas-tight syringes that fitted directly to the luer-lock fittings at each port. The column was saturated with Milli-Q®-filtered water (filter-sterilized (0.2 $\mu$m)) by passing approximately 1 gallon of water through the column at a flow rate of 2.2 mL/min. A 100 mM sodium sulfide solution adjusted to pH 7.2 was introduced into the column, also at a set flow rate of 2.2 mL/min. The soil was darkened by the rapid precipitation of ferrous sulfide, as the sulfide solution entered the soil zones of the column. Over a 72 h period, in which 11.35 L of 100 mM sodium sulfide solution was pumped through the column, the soil's color changed from a light tan to black. Milli-®-filtered water was passed through the column to remove residual sulfide in solution. A 1 mg/L aqueous solution of TCE was introduced into the column at a flow rate of 0.05 mL/min.

Table 3 lists the cumulative column residence times for each sampled port at input flow rate of 0.50 mL/min. The rate data in Table 3 indicate a TCE dechlorination rate constant. The Table shows steady-state concentrations of TCE and daughter products measured in a soil column amended with sodium sulfide. Concentrations were averaged over 65 pore volumes of groundwater influent (influent flow rate was set at 0.050 mL/min).

TABLE 3

| Column Sample port | inches from column bottom | media | cumulative residence time in redox-active zone, min | [TCE] mg/L | [cis DCE] mg/L | [VC] mg/L | ethane, ethene and ethyne as equiv. TCE consumed | effluent pH |
|---|---|---|---|---|---|---|---|---|
| 1 | 2 | sand | — | 1.41 | n.d. | n.d. | 0.00 | 7.3 |
| 2 | 4 | sand | — | 1.38 | n.d. | n.d. | 0.00 | 7.3 |
| 3 | 6 | sand | — | 1.37 | n.d. | n.d. | 0.00 | 7.4 |
| 4 | 8 | soil | 12 | 1.35 | 0.002 | n.d. | 0.08 | 7.5 |
| 5 | 10 | soil | 58 | 1.30 | 0.001 | n.d. | 0.15 | 7.5 |
| 6 | 12 | soil | 105 | 1.18 | 0.006 | 0.003 | 0.47 | 7.6 |
| 7 | 14 | soil | 152 | 1.11 | 0.009 | 0.004 | 0.60 | 7.5 |
| 8 | 16 | soil | 198 | 1.06 | 0.014 | 0.006 | 0.73 | 7.7 |
| 9 | 18 | soil | 245 | 0.96 | 0.020 | 0.005 | 0.77 | 7.7 |
| 10 | 20 | soil | 291 | 0.85 | 0.021 | 0.005 | 0.87 | 7.6 |
| 11 | 22 | sand | — | 0.84 | 0.018 | 0.004 | 0.62 | 7.6 |

Concentrations of TCE daughter products, cis-DCE, VC, and fully reduced products (ethene, ethane, and ethyne) as equivalents of TCE are also given in Table 3 with influent and effluent pH's measured by a Ross Sure-Flow pH combination electrode.

The examples demonstrate that sulfide addition to soil effects complete reduction dechlorination of TCE. Control reactions show that no degradation of TCE takes place in the absence of sulfide.

While various embodiments were disclosed herein, it will be appreciated from the specification that various combinations of elements, variations, and improvements therein may be made by those skilled in the art, and are within the scope of the invention.

What is claimed is:

1. A composition of matter for treating an aqueous composition containing at least one contaminant, said composition of matter comprising a non-iron sulfide emplaced with an iron (III)-containing compound in a reaction zone in contact with said aqueous composition, said at least one contaminant being selected from the group consisting of halogenated hydrocarbons, oxygen-containing metallic species, radionuclides, and mixtures thereof.

2. The composition of claim 1, wherein said non-iron sulfide comprises a sulfide salt.

3. The composition of claim 1, wherein said non-iron sulfide comprises sodium sulfide, sodium hydrogen sulfide or hydrogen sulfide.

4. The composition of claim 1, wherein the aqueous composition has a pH in a range between about 3 and about 11.

5. The composition of claim 1, wherein the aqueous composition is unbuffered.

6. A composition of matter for treating an aqueous composition containing at least one contaminant, said composition of matter comprising a non-iron sulfide emplaced with an iron (III)-containing compound in a reaction zone in contact with said aqueous composition, wherein said aqueous composition is produced by the migration of groundwater through mine tailings.

7. A composition of matter for treating an aqueous composition containing at least one contaminant, said composition of matter comprising a non-iron sulfide emplaced with an iron (III)-containing compound in a reaction zone in contact with said aqueous composition, wherein said at least one contaminant is selected from the group consisting of halogenated hydrocarbons.

8. A composition of matter for treating an aqueous composition containing at least one contaminant, said composition of matter comprising a non-iron sulfide emplaced with an iron (III)-containing compound in a reaction zone in contact with said aqueous composition, wherein said at least one contaminant is an oxidized chromium-containing species.

9. A composition of matter for treating an aqueous composition containing at least one contaminant, said composition of matter comprising a non-iron sulfide emplaced with an iron (III)-containing compound in a reaction zone in contact with said aqueous composition, wherein said at least one contaminant is selected from the group consisting of tetrachloroethylene, trichloroethylene, dichloroethylene, vinyl chloride, trichloroethane, dichloroethane, chloroethane, carbon tetrachloride, chloroform, dichloromethane, and chloromethane.

10. A composition of matter for treating an aqueous composition containing at least one contaminant, said composition of matter comprising a non-iron sulfide emplaced with an iron (III)-containing compound in a reaction zone in contact with said aqueous composition, wherein said non-iron sulfide comprises polymer-coated non-iron sulfide compounds to provide a slow-release composition of said non-iron sulfide compounds.

11. A composition of matter for treating an aqueous composition containing at least one contaminant, said composition of matter comprising a non-iron sulfide emplaced with an iron (III)-containing compound in a reaction zone in contact with said aqueous composition, wherein said halogenated hydrocarbon is selected from the group consisting of: trichloroethylene, dichloroethylene, and vinyl chloride.

12. A composition of matter for treating an aqueous composition containing at least one contaminant, said composition of matter comprising a non-iron sulfide emplaced with an iron (III)-containing compound in a reaction zone in contact with said aqueous composition, a pH of said aqueous composition being controlled by the addition of a buffering agent.

13. The composition of claim 12, wherein said pH is controlled within a range of about 5 to about 9.

14. A composition of matter for treating an aqueous composition containing at least one contaminant, said composition of matter comprising a non-iron sulfide emplaced with an iron (III)-containing compound in a reaction zone in contact with said aqueous composition, said composition further comprising a reductant to solubilize ferrous ion.

15. The composition of claim 14, wherein said reductant is an organic acid or salt of an organic acid.

16. A composition of matter for treating an aqueous composition containing at least one contaminant, said composition of matter comprising a non-iron sulfide emplaced with an iron (III)-containing compound in a reaction zone in contact with said aqueous composition, wherein said aqueous composition is a groundwater composition.

17. A composition of matter for treating an aqueous composition containing at least one contaminant, said composition of matter comprising a non-iron sulfide emplaced with an iron (III)-containing compound in a reaction zone in contact with said aqueous composition, wherein said aqueous composition is derived from at least one of an aquifer, moist soil, river sediment, or pond sediment.

18. A composition of matter for treating an aqueous composition containing at least one contaminant, said composition of matter comprising a non-iron sulfide emplaced with an iron (III)-containing compound in a reaction zone in contact with said aqueous composition, wherein said iron-containing mineral comprises at least one magnetite, goethite, hematite, maghemite, ferrihydrite, lepidocricite, or mixtures thereof.

19. A composition of matter for treating an aqueous composition containing at least one contaminant, said composition of matter comprising a non-iron sulfide emplaced with an iron (III)-containing compound in a reaction zone in contact with said aqueous composition, wherein said reaction zone comprises a contact tower.

20. A composition of matter for treating an aqueous composition containing at least one contaminant, said composition of matter comprising a non-iron sulfide emplaced with an iron (III)-containing compound in a reaction zone in contact with said aqueous composition, wherein said iron is admixed with an inert filler.

21. The composition of claim 20, wherein said inert filler comprises pea gravel or coarse sand.

22. A composition of matter for treating an aqueous composition containing at least one contaminant, said composition of matter comprising a non-iron sulfide emplaced with an iron (III)-containing compound in a reaction zone in contact with said aqueous composition, wherein said aqueous composition is contaminated with oxidized metal or radionuclide, and said sulfide is mineralized to ferrous sulfide to react with and to reduce said oxidized metal or radionuclide.

23. The composition of matter of claim 22, wherein said at least one contaminant of hexavalent chromium and hexavalent uranium.

24. The composition of matter of claim 22, wherein said at least one contaminant is a chromate.

25. The composition of matter of claim 22, wherein said radionuclides comprise a urinary ion.

26. The composition of matter of claim 22, wherein said aqueous composition is further contaminated with at least one halogenated hydrocarbon, and said non-iron sulfide is mineralized to ferrous sulfide to react with and dehalogenate said at least one halogenated hydrocarbon.

* * * * *